April 24, 1934.  W. E. TURNER  1,956,109
APPARATUS FOR PATCHING SHEET RUBBER ARTICLES
Filed July 18, 1931
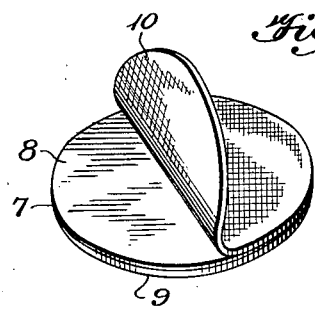
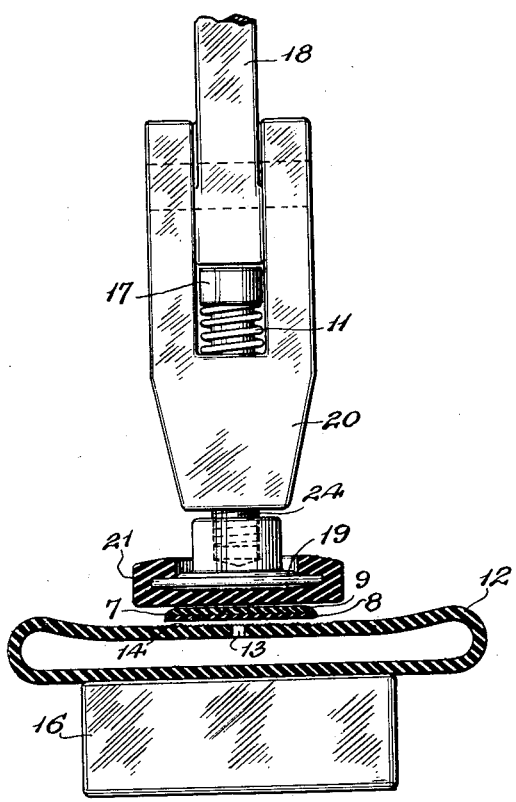
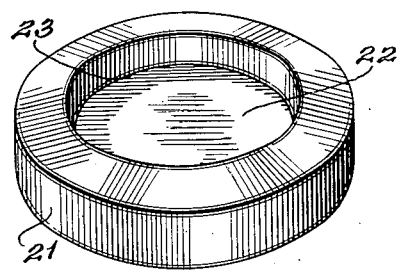
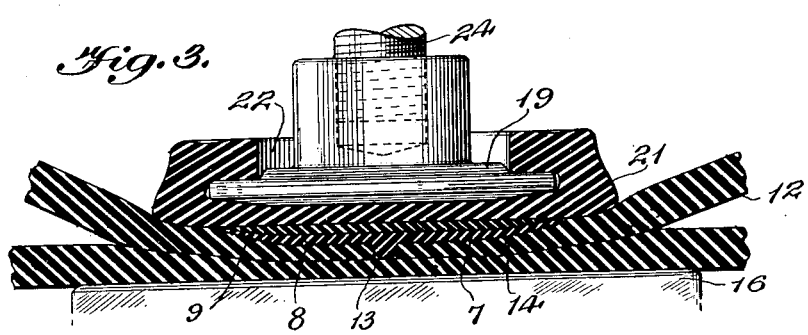
Inventor
W. E. Turner.

Patented Apr. 24, 1934

1,956,109

UNITED STATES PATENT OFFICE 1,956,109

APPARATUS FOR PATCHING SHEET RUBBER ARTICLES

William E. Turner, Yakima, Wash.

Application July 18, 1931, Serial No. 551,756

3 Claims. (Cl. 152—27)

My invention relates to the patching of inner tubes of pneumatic tires and other articles composed of sheet rubber, and the invention aims to provide a novel and improved method of patching the article without the use of glue, cement or other adhesives, and without using gasoline or other cleaning agent, this application being a continuation in part of application Ser. No. 300,536, filed August 18, 1928.

The invention has for one of its objects the provision of a method of patching the inner tube of a pneumatic tire or other sheet rubber article in a convenient and facile manner, and to provide a patch which will be efficient and durable.

A further object is to provide a suitable press which simplifies all repairing of inner tubes and other rubber articles.

A still further object is to provide a press with a pad or block made of rubber, or other suitable material, for expanding a patch and the roughened surface of the article being repaired and causing the uncured rubber face of a patch to impregnate the roughened surface of the article while in an expanded state and making a stronger adhesion than can be had by using cement.

In the accompanying drawing forming a part of this application and in which like numerals are employed to designate like parts in all views, Figure 1 is a perspective view of one of the patches employed in the present method.

Figure 2 is a section through the patch and article to which it is applied before receiving pressure.

Figure 3 is a similar section showing the patch and article under pressure.

Figure 4 shows the finished repair patch, and

Figure 5 is a perspective view of the rubber pad or block adapted to be disposed on the pressure head.

In the drawing wherein for the purpose of illustration is shown a preferred embodiment of my invention, the numeral 7 designates a patch which may be of any size and shape, and an assortment of patches may be provided to be used for different purposes and for holes of different sizes and shapes. The inner surface 8 of the patch is of raw rubber, while the outer surface 9 is vulcanized. The surface 8 is normally protected from dust and dirt by a protective piece 10 of suitable cloth or other material which may be readily peeled or stripped off, as seen in Fig. 1, to expose the raw rubber surface 8 of the patch.

In carrying out the method, the article or rubber sheet 12 having the hole 13 to be patched has its surface roughened, as at 14 (Fig. 2) by means of a buffer, sand paper, wire brush, rasp, or the like, and after the protective piece 10 is peeled from the patch 7 the patch is placed over the hole 13 with the raw rubber surface 8 against the roughened surface 14. No cleansing agent or adhesive is employed.

The article 12 and patch are then placed in a press 20 and are pressed together under high pressure for several seconds. The pressure applied is sufficient to compress the article and patch to a small fraction of their normal thickness. The pressure expands the elastic block or pad 21 which is fitted to the pressure head 19 which in turn expands the roughened surface of the article being repaired as well as the patch itself thereby stretching and forcing the surface 8 of the patch into intimate relation with the surface 14 of the article to cause adhesion and the uniting of the patch with the article 12 and making a much stronger adhesion than is possible by using cement. The pressure is removed after several seconds and the expanded article and patch contract to their normal size whereby a very tight adhesion is had, and the repair or patch is perfectly set in about 30 minutes.

When the patch is used on the outer surface of the inner tube of a pneumatic tire, the pressure of the tube against the patch which bears against the tire casing will assist in uniting the patch and tube, so that the tube may be placed promptly within the casing after the patch is applied. The patch is equal to a vulcanized patch, and will provide a permanent seal for the hole in the tube or article 12.

20 illustrates a press which may be conveniently employed in service stations and tire repair shops, which includes a base 16 on which the tube or article may be placed, and a plunger 17 having a spring 11 above the base operated by a lever 18 shown partly broken away. A pressure head 19 is screw-threaded at 24 on the lower terminal of the plunger 17 to force the patch down on the base, and said head may be screwed on the plunger to regulate the pressure when the handle is swung downwardly to the limit. Adapted to be removably disposed on the pressure head 19 is a pad or block of elastic rubber, or similar material, 21 for expanding the patch and the article to be repaired. The block 21 has a top central opening 22 and is provided with a flange 23, by means of which the block 21 is secured to the pressure head 19 and is held thereby.

It will be noted that when pressure is applied to the article to be repaired, the pad 21 expands. This expansion causes the pad to grip the patch and article in such a way as to cause their expansion with the pad. Therefore, while being held by pressure in the expanded state, the repair is made and causes the uncured rubber face of the patch to impregnate the roughened surface of the article. When the press is released contraction of the patch and article repaired takes place, thus giving a much better, neater, and stronger repair than can be had by other methods.

It is to be understood that the form of my invention herewith shown and described is to be taken as a preferred embodiment of the same and that various changes in the shape, size and arrangement of parts may be resorted to without departing from the spirit of my invention and the scope of the subjoined claims.

Having thus described my invention what I claim is:

1. An apparatus for patching sheet rubber articles comprising a base for holding both the article and a superposed rubber patch for mending the same, a pressure member movable relative to the base, said member having an elastic rubber head, whereby when the member is pressed into contact with the patch, the head, patch and article are expanded.

2. An apparatus for patching an apertured sheet rubber article comprising a base for holding the apertured portion of the article and a superposed patch for mending the same, a plunger having a stretchable head positioned above the base, means for pressing the head into contact with the patch, whereby the head, article and patch will be expanded and the latter will be partially forced into and plug the aperture.

3. An apparatus for patching an apertured sheet rubber article comprising a base adapted to hold the apertured portion of the article and a superposed rubber patch for mending the same, a plunger having an adjustable elastic rubber head positioned above the base, means for moving the plunger relative to the base for bringing the head into pressure contact with the patch, whereby the head, patch and apertured portion of the article are expanded.

WILLIAM E. TURNER.